(12) United States Patent
Sadasue et al.

(10) Patent No.: US 8,649,616 B2
(45) Date of Patent: Feb. 11, 2014

(54) IMAGE PROCESSING APPARATUS AND IMAGE PROCESSING METHOD

(75) Inventors: Tamon Sadasue, Tokyo (JP); Hiroyuki Sakuyama, Tokyo (JP); Junichi Hara, Kanagawa (JP); Junichi Yamagata, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 372 days.

(21) Appl. No.: 12/923,191

(22) Filed: Sep. 8, 2010

(65) Prior Publication Data

US 2011/0064309 A1 Mar. 17, 2011

(30) Foreign Application Priority Data

Sep. 15, 2009 (JP) ................................ 2009-213108

(51) Int. Cl.
*G06K 9/36* (2006.01)
(52) U.S. Cl.
USPC ........... 382/232; 382/273; 382/239; 382/238; 382/166
(58) Field of Classification Search
USPC ......... 382/232, 240, 244, 247, 233, 190, 195, 382/305, 252, 248, 239, 173, 302, 238, 382/166; 345/501, 581, 611; 348/143, 154, 348/16; 375/240.08
See application file for complete search history.

(56) References Cited

U.S. PATENT DOCUMENTS

| | | | |
|---|---|---|---|
| 6,633,670 B1 * | 10/2003 | Matthews ..................... | 382/176 |
| 6,731,800 B1 * | 5/2004 | Barthel et al. ................ | 382/176 |
| 7,013,049 B2 * | 3/2006 | Sakuyama ..................... | 382/240 |
| 7,031,541 B2 | 4/2006 | Sakuyama | |
| 7,228,000 B2 | 6/2007 | Sakuyama | |
| 7,315,651 B2 * | 1/2008 | Sakuyama et al. ............ | 382/232 |
| 7,319,792 B2 * | 1/2008 | Hara et al. .................... | 382/232 |
| 7,336,852 B2 | 2/2008 | Nomizu et al. | |
| 7,352,907 B2 | 4/2008 | Sakuyama et al. | |
| 7,362,904 B2 | 4/2008 | Hara et al. | |
| 7,376,266 B2 * | 5/2008 | Simard et al. ................ | 382/166 |
| 7,386,175 B2 | 6/2008 | Hara et al. | |
| 7,394,470 B2 | 7/2008 | Nishimura et al. | |
| 7,430,327 B2 | 9/2008 | Kodama et al. | |
| 7,450,768 B2 | 11/2008 | Sakuyama et al. | |

(Continued)

FOREIGN PATENT DOCUMENTS

| | | |
|---|---|---|
| JP | 2001-177827 | 6/2001 |
| JP | 03-765177 | 2/2006 |

(Continued)

OTHER PUBLICATIONS

European Search Report dated Jan. 18, 2011.

(Continued)

*Primary Examiner* — Mekkonen Bekele
(74) *Attorney, Agent, or Firm* — Harness, Dickey & Pierce, P.L.C.

(57) ABSTRACT

An image processing apparatus includes an image separating unit that separates and creates a plurality of derivative images from an input image based on feature of the input image; a coding unit that codes each of the derivative images separately, couples coded data of the derivative images, and generates multilayer structure data; and a controller that controls a code amount of coded data of at least one derivative image with a low code assignment priority out of the derivative images so that a data amount of the multilayer structure data is equal to or less than a limit amount.

18 Claims, 9 Drawing Sheets

(56) References Cited

U.S. PATENT DOCUMENTS

| | | | |
|---|---|---|---|
| 7,477,793 | B1 | 1/2009 | Boliek et al. |
| 7,505,630 | B2 | 3/2009 | Sakuyama et al. |
| 7,577,301 | B1 | 8/2009 | Wu et al. |
| 7,583,847 | B1 * | 9/2009 | Boliek et al. ............... 382/240 |
| 7,593,578 | B2 | 9/2009 | Sakuyama et al. |
| 7,912,324 | B2 * | 3/2011 | Suino et al. ................. 382/302 |
| 2001/0004404 | A1 | 6/2001 | Itokawa |
| 2003/0202697 | A1 * | 10/2003 | Simard et al. ............... 382/195 |
| 2004/0202371 | A1 | 10/2004 | Kodama et al. |
| 2004/0208379 | A1 | 10/2004 | Kodama et al. |
| 2004/0208380 | A1 | 10/2004 | Aoki et al. |
| 2005/0275666 | A1 | 12/2005 | Nagarajan |
| 2006/0245655 | A1 * | 11/2006 | Suino et al. ................. 382/232 |
| 2006/0269151 | A1 * | 11/2006 | Sakuyama ................... 382/232 |
| 2007/0064275 | A1 * | 3/2007 | Ohk ........................ 358/426.01 |
| 2007/0201752 | A1 * | 8/2007 | Gormish et al. ............. 382/232 |
| 2008/0273807 | A1 | 11/2008 | Dauw et al. |
| 2009/0154807 | A1 * | 6/2009 | Rossato et al. ............... 382/173 |
| 2009/0180699 | A1 | 7/2009 | Boliek et al. |

FOREIGN PATENT DOCUMENTS

| | | |
|---|---|---|
| JP | 2006-352365 | 12/2006 |
| JP | 04-064279 | 1/2008 |
| JP | 2008-236169 | 10/2008 |

OTHER PUBLICATIONS

"JPEG 2000 Image coding system: compound image file format, ISO/IEC CD15444-6," ISO/IEC JTC1/SC29/WG1 N2114, pp. 1-42, Mar. 9, 2001.

"ITU-T Recommendation T.44-Mixed raster content (MRC)," pp. 1-37, Apr. 1, 1999.

Abstract of Japanese Publication No. JP2004-297712, published on Oct. 21, 2004.

Abstract of Japanese Publication No. JP11-232468, published on Aug. 27, 1999.

Office Action dated Mar. 19, 2013 in corresponding Japanese Patent Application No. 2009-213108.

* cited by examiner

IMAGE PROCESSING APPARATUS AND IMAGE PROCESSING METHOD

CROSS-REFERENCE TO RELATED APPLICATIONS

The present application claims priority to and incorporates by reference the entire contents of Japanese Patent Application No. 2009-213108 filed in Japan on Sep. 15, 2009.

BACKGROUND OF THE INVENTION

1. Field of the Invention

The present invention relates to an image processing apparatus and an image processing method.

2. Description of the Related Art

For example, Japanese Patent Application Laid-open No. 2008-236169 discloses a technique in which a format of an input image is converted based on the features obtained from an image area thereof, and the converted image is decomposed into a multilayer structure that includes a character image, a natural image, and a mask image (selection data) that indicates which of the character image and the natural image is selected. Thus, the data amount is reduced while maintaining the edge of the character and smooth image quality in the natural image area.

Mail sending and receiving systems generally set an upper limit of the data capacity for sending and receiving data in order to prevent speed reduction of the system caused by sending and receiving a large amount of data, problems in which other accounts cannot be used because the disk capacity of the system is used up, and similar problems.

In such situations, when data exceeding the upper limit of the data capacity is to be sent, the process is usually failed at the sending side. On the other hand, when data exceeding the upper limit of the data capacity at the receiving side is sent, the process succeeds at the sending side but fails at the receiving side. As a result, the data cannot be sent.

In the related-arts described above, it is desirable to control the data amount of the multilayer structure data generated by compression utilizing the multilayer structure at equal to or less than a predetermined or a designated limited amount, not only for sending and receiving mails, but also for utilizing the data. Moreover, the output of data with less image degradation is desirable under the control of the capacity of image data sent and received.

Japanese Patent No. 3765177 discloses a technique in which data is divided into stripe shaped areas depending on the buffer size at the receiving side and is sent so as not to exceed the limitation of the buffer capacity during multilayer image conversion. During the sending, a start line or an end line of lines in which all pixels in one line are in a predetermined color is detected, and the data is divided by the lines so as not to cause displacements at the boundary between the divided stripe shaped areas.

Japanese Patent No. 4064279 discloses a rate control technique that controls the creation of codes at a designated compressibility in a Joint Photographic Experts Group 2000 (JPEG2000) coding process. As represented in this example, JPEG2000 has scalability in resolution or image quality and readily flexibly changes a code amount created by reducing the resolution or the image quality of data from that of its original data.

SUMMARY OF THE INVENTION

It is an object of the present invention to at least partially solve the problems in the conventional technology.

According to an aspect of the present invention, there is provided an image processing apparatus that includes an image separating unit that separates and creates a plurality of derivative images from an input image based on feature of the input image; a coding unit that codes each of the derivative images separately, couples coded data of the derivative images, and generates multilayer structure data; and a controller that controls a code amount of coded data of at least one derivative image with a low code assignment priority out of the derivative images so that a data amount of the multilayer structure data is equal to or less than a limit amount.

According to an another aspect of the present invention, there is provided an image processing method that includes separating and creating a plurality of derivative images from an input image based on feature of the input image; coding each of the derivative images separately; coupling coded data of the derivative images; generating multilayer structure data; and controlling a code amount of coded data of at least one derivative image with a low code assignment priority out of the derivative images so that a data amount of the multilayer structure data is equal to or less than a limit amount.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An image compressing method utilizing a multilayer structure is simply described.

Figure 1:
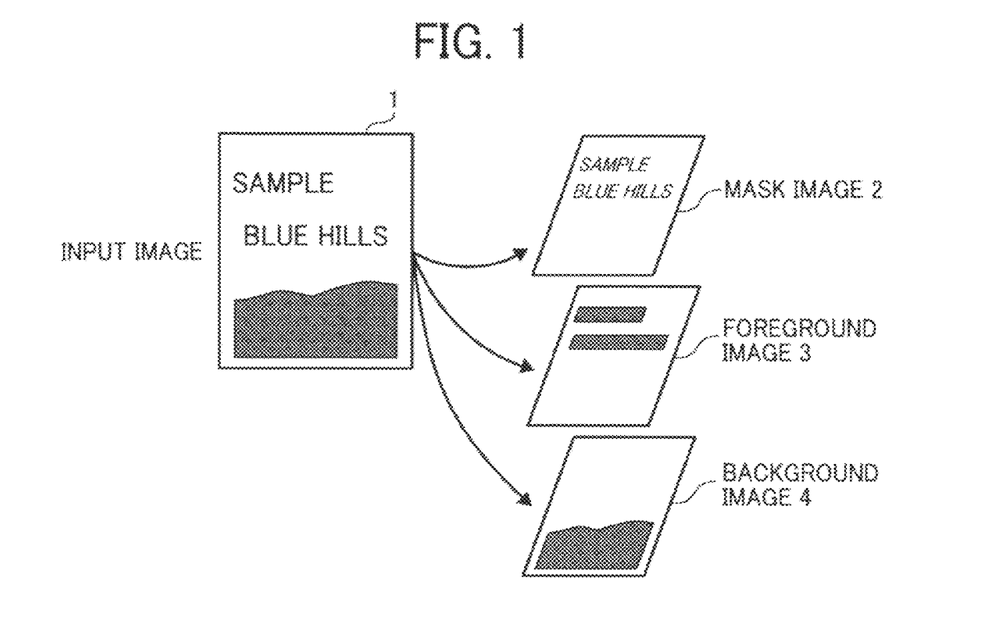
FIG. 1 is a schematic diagram for explaining separation and creation of layer images (derivative images)

FIG. 1 illustrates an example in which the format of an input image 1 is converted into a mixed raster content (MRC) format. Three layer images, that is, a background image 4, a foreground image 3, and a mask image 2 are separated and created from the input image 1. The mask image means selection data that indicates which of the background data and the foreground data is selected for a pixel in the mask image during multilayer image synthesis.

The MRC is not limited to the structure of FIG. 1 and includes a structure in which data is separated into a background image and a plurality of foreground images that include transmissive pixels and are superimposed on the background image or similar structures. The structure of FIG. 1 is exemplified for the sake of simplicity.

A method of separating and creating a plurality of layer images (the mask image 2, the foreground image, the background image in this example) from the input image 1 is described.

A scanned image data is assumed to be the input image 1, and features such as the edge strength and the lightness are extracted from the input image 1. Typically, edges or the frequencies of samples as pixels are different between a character area and a natural image area in an image. Therefore, features such as edge strength and lightness can be extracted as necessary features for separating the character area and the natural image area.

Separation information is created based on the features extracted from the input image. The separation information is information indicating which of the background and the foreground is the image into which the pixels of the input image 1 is individually separated. In other words, the separation information is information directly used for creating the mask image that is information indicating which of the background pixels and the foreground pixels are selected for superimposing.

The mask image 2 is created according to the separation information. The mask image indicates which of the background and the foreground pixels is selected for superimposing as described above and is usually represented as binary data. For example, the mask image is created as binary bitmap data in which a pixel employing the background pixel is assumed to be 0, and a pixel employing the foreground pixel is assumed to be 1. In the mask image 2, details such as characters in the image is formed, and thus, the mask image 2 is typically preferably created as an image having resolution same as that of the input image.

The background image 4 and the foreground image 3 are created by inputting the input image 1 and the separation information indicating which of the background and the foreground is the image into which the pixels of the input image are individually separated. The basic concept for creating the background image 4 and the foreground image 3 is that the background image 4 is created from the pixels in the input image 1 that are determined as the background according to the separation information, and that the foreground image 3 is created from the pixels in the input image 1 that are determined as the foreground according to the separation information.

For example, the following processes may be performed to improve compressibility. A resolution conversion process in which the resolution of the foreground image 3 and the background image 4 is lowered, and a process in which the portion where the foreground image 3 is removed from the input image 1 during the background image creation is filled with the vicinity pixels.

Figure 2:
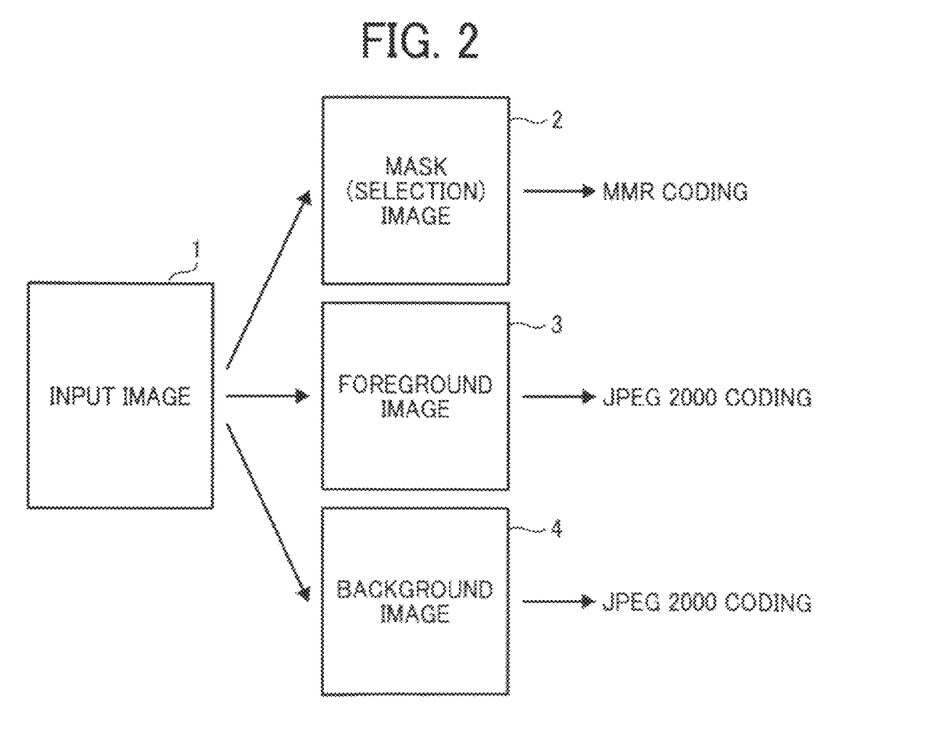
FIG. 2 is a schematic diagram for explaining coding of each layer image.

Each of the created layer images (the mask image 2, the background image 4, and the foreground image 3) is separately compressed. In other words, as illustrated in FIG. 2, when the mask image 2 is a binary image, the mask image 2 is compressed using, for example, modified modified READ (MMR) (or joint bi-level image experts group (JBIG) or JBIG2) that is a binary image coding system. The background image 4 and the foreground image 3 as multivalued images are individually compressed using a multivalued image coding system. For controlling the code amounts of the background image 4 and the foreground image 3, for example, Joint Photographic Experts Group 2000 (JPEG2000) (ISO/IEC 15444-1, ITU-T T. 800) is used as a cording system.

Finally, multilayer structure data such as a Portable Document Format (PDF) is created by coupling coded data of the mask image 2, the background image 4, and the foreground image 3. For example, when a PDF is created, the PDF indicates base image data for superimposing layers, selection data for pixels to be superimposed, data of images to be superimposed, the number of pixels of each data, and a filter format of each data.

Based on the description above, the embodiments of the preset invention are described in detail below.

Figure 3:
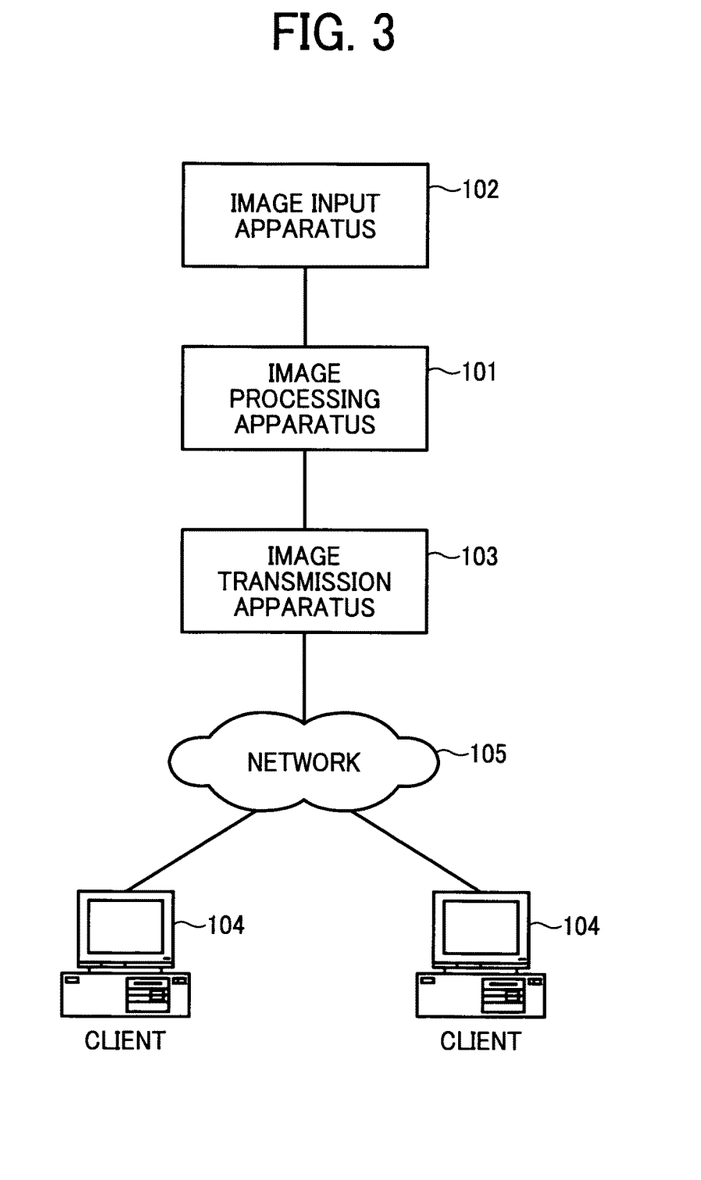
FIG. 3 is a schematic diagram for explaining an example of a system employing an image processing apparatus according to an embodiment of the present invention.

FIG. 3 illustrates a structural example of a system in which an image processing apparatus 101 according to an embodiment of the present invention sends multilayer structure data to client computers 104 in a network 105 in conjunction with an image input apparatus 102 and an image transmission apparatus 103. The image input apparatus 102 in this example is typically an optical reader such as a scanner. The image transmission apparatus 103 is, for example, a Server Message Block (SMB) server or a similar apparatus that reads and writes data from and on a mail server or the client computer 104 in the network.

Figure 4:
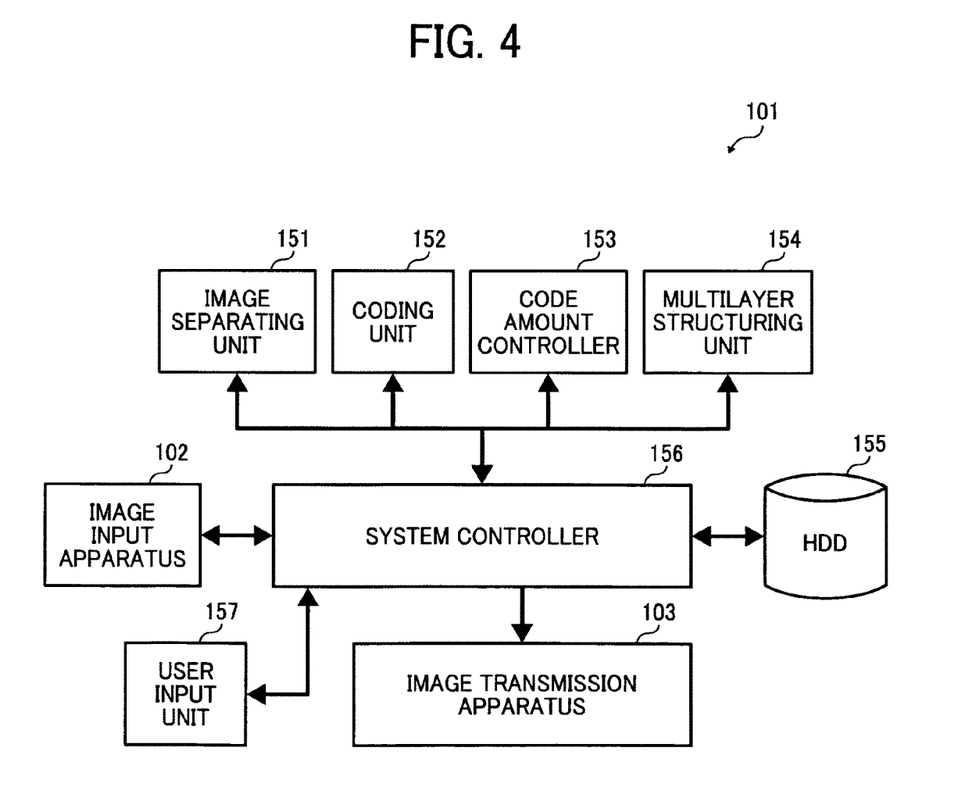
FIG. 4 is a block diagram of an example of an internal structure of the image processing apparatus.

FIG. 4 is a block diagram of an example of the internal structure of the image processing apparatus 101. In this example, the image processing apparatus 101 includes an image separating unit 151 that separates and creates a plurality of layer images (derivative images) from an input image, a coding unit 152 that codes each of the layer images separately, a code amount controller 153 that controls a code amount by deleting codes from the coded data of the layer images, a multilayer structuring unit 154 that creates multilayer structure data such as a PDF file by coupling the coded data of the layer images after the control of the code amount, a hard disk drive (HDD) 155 used for storing therein multilayer structure data such as a created PDF file, and a system controller 156 that controls the operation performed by the apparatus. The image processing apparatus 101 can include a user input unit 157 by which, for example, users designate a limit amount (described later) of data regarding output data, that is, multilayer structure data such as a PDF file. A limit amount of data can also be designated, for example, from the client computer 104 in the network. When a fixed value is previously set as the limit amount, a unit by which users designate the limit amount is not necessarily included.

The processes in the image processing apparatus 101 are specifically described below with reference to several embodiments.

First Embodiment

Figure 5:
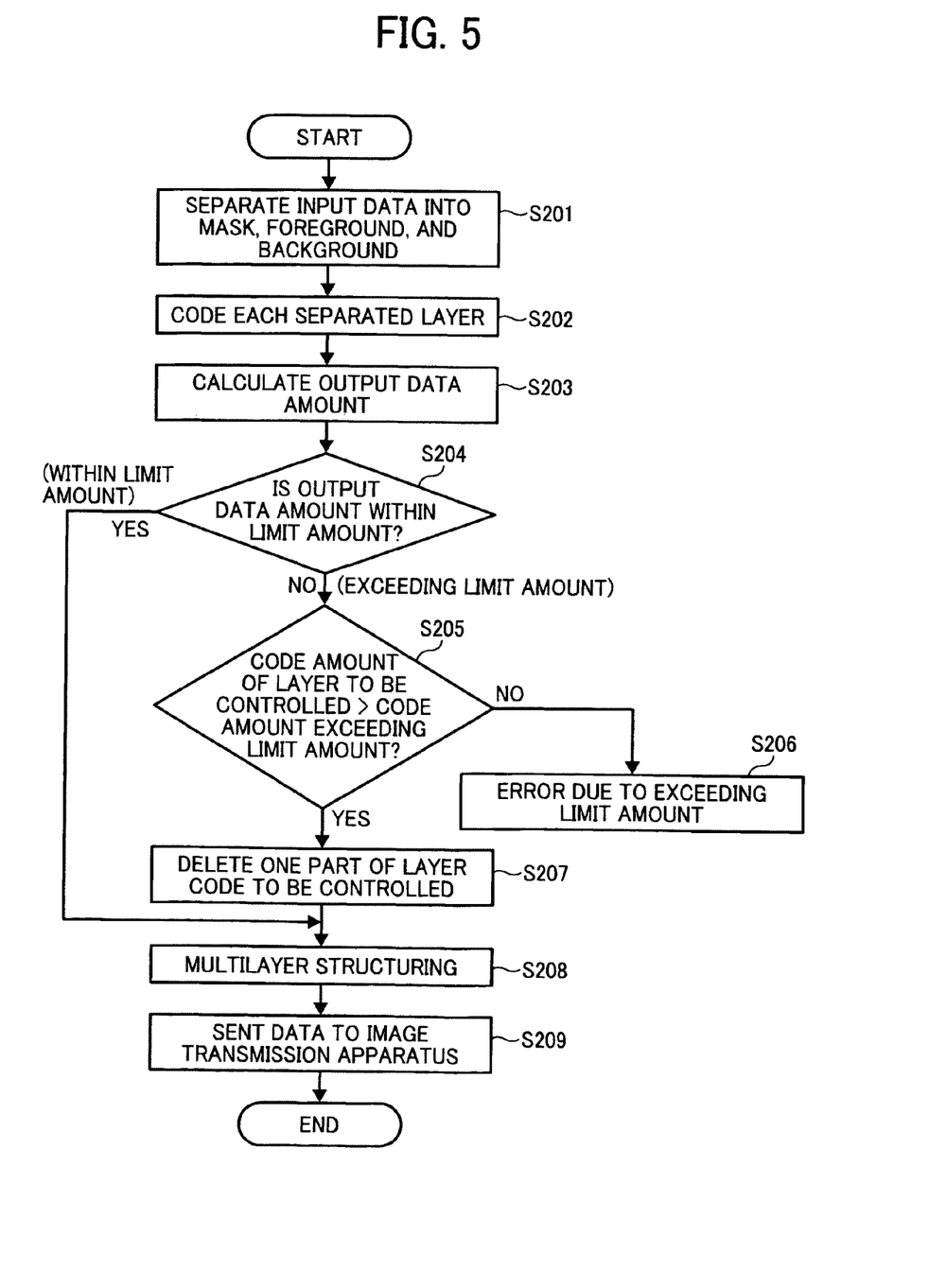
FIG. 5 is a flowchart for explaining a process in First Embodiment.

FIG. 5 is a flowchart for explaining a process in the image processing apparatus 101 according to the present embodiment of the present invention. The process is described below with reference to a process flow illustrated in FIG. 5.

<Step S201> The image separating unit 151 extracts local features such as an edge from an input image received from the image input apparatus 102 and individually separates pixels in the input image into either a character pixel or a pattern pixel based on the extracted features. Subsequently, the image separating unit 151 creates three layer images (derivative images) of a mask (selection) image in which each pixel in the input image is distinguished whether it is a character pixel or a pattern pixel according to binary information, a foreground image created according to color information of the character pixel, and a background image created according to color information of the pattern pixel.

<Step S202> In the coding unit 152, each layer image created in the image separating unit 151 is individually coded and compressed. The mask image is stored as binary data and thus is coded using, for example, MMR that is a binary image coding system. Besides MMR, JBIG, JBIG2, or the like may also be used as a coding system for the mask image. The foreground image and the background image are stored as multivalued data and thus are individually coded using JPEG2000 that is a multivalued image coding system. The JPEG2000 coded data is coded data controllable in multistage image quality by deleting the codes and is suitable when a code amount is controlled by deleting the codes.

<Step S203> In the code amount controller 153, the coded data of the three layer images obtained at the preceding step is coupled as it is (without deleting the codes), and calculates a data amount (output data amount) when multilayer structure data as output data is created. As illustrated in the upper side of FIG. 6, the output data amount is obtained by adding a data amount of the coded data of the mask (selection) image, the background image, and the foreground image obtained at step S202 to a data amount for format description related to multilayer structuring. For example, when a PDF file is created as multilayer structure data, the format description of a PDF file includes page object description, content object description, image mask object description, image object description, and filter description indicating an image coding system. Therefore, an output data amount is obtained by adding the data amount of the format description to the data amount of the coded data of each layer image.

<Step S204> The code amount controller 153 judges whether the output data amount calculated at the preceding step is within the limit amount. The limit amount may be a predetermined fixed value or may be a value designated by users through the user input unit 157 or similar units. If the output data amount is within the limit amount, the system control goes to a multilayer structuring process at Step S208 because the control of the code amount by deleting the codes is unnecessary, but if the output data amount exceeds the limit amount, the system control goes to Step S205.

<Step S205> The code amount controller 153 calculates a code amount exceeding the limit amount by subtracting the limit amount from the output data amount calculated at Step S203 and judges whether the code amount of the layer image to be controlled (the background image in this embodiment) is larger than the code amount exceeding the limit amount. If the code amount of the layer image to be controlled is judged to be equal to or less than the code amount exceeding the limit amount (No at Step S205), the final output data amount cannot be within the limit amount by deleting the codes of the layer image to be controlled, and thus, the system controller 156 performs error control (Step S206). If the code amount of the layer image to be controlled exceeds the code amount exceeding the limit amount (Yes at Step S205), the system control goes to Step S207.

Figure 6:
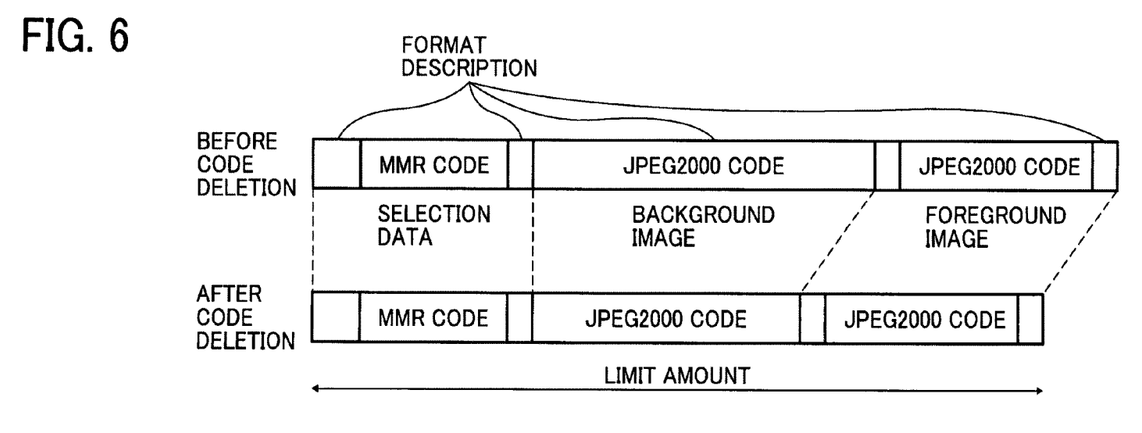
FIG. 6 is a schematic diagram for explaining an output data amount before and after code deletion.

<Step S207> The code amount controller 153 deletes the codes in the code amount exceeding the limit amount calculated at the preceding step from the JPEG2000 coded data of the background image as the layer image to be controlled and adjusts the output data amount to fall within the limit amount as illustrated at the lower side of FIG. 6.

In the simplest method for deleting codes, the codes in the code amount exceeding the limit amount may be deleted from the end of the JPEG2000 coded data. This is because a JPEG2000 decoder can stop MQ decoding as entropy decoding at a point when the codes are all deleted and can create images using the decoded results at the point.

Figure 7:
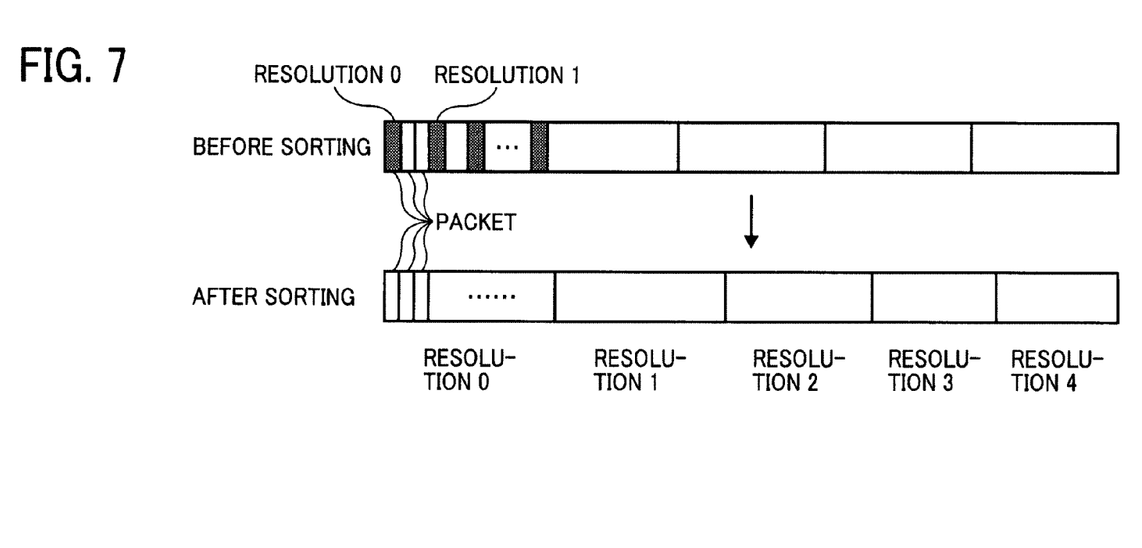
FIG. 7 is a schematic diagram for explaining the sorting of codes.

In addition, for example, the code amount controller 153 may also delete the codes from the last code sequentially after the following sorting operation in order to make image degradation due to the deletion of the codes become unnoticeable as much as possible. Coded data in which the codes with different resolution are scattered as illustrated at the upper side of FIG. 7 is sorted so that the codes with the same resolution are collected and sequenced from the code with low resolution as illustrated at the lower side of FIG. 7.

For the JPEG2000 coded data as exemplified in this embodiment, five types of code sorting orders (progression order) are defined as basic specifications. For example, for the coded data in a PCRL progression order in which the codes are sequenced in a position (P) order, when the codes are deleted from the end, image degradation at one spatial area of the image is noticeable, which is not preferred. For such coded data, the codes are sorted in an LRCP progression order in which the codes are sequenced in a layer (L) order or in a RLCP progression order in which the codes are sequenced in a resolution (R) order and then are deleted from the end of the coded data. As a result, the image quality is gently degraded due to the deletion of the codes as a whole image, and thus, image degradation due to the deletion of the codes becomes unnoticeable. In the JPEG2000 coded data, the coded data in different progression orders can be readily reconstituted by performing such sorting of the codes in a code state (without decoding). This embodiment also includes such an embodiment in which the codes are deleted after the sorting of the codes is performed.

Although not yet described, a low code assignment priority is set in the background image, and high code assignment priorities are set in both the mask image and the foreground image in the present embodiment. The control of the code amount by deleting the codes is performed on the coded data of the layer image with a low code assignment priority. Therefore, only the coded data of the background image is targeted for the control of the code amount in this embodiment.

Alternatively, for example, the lowest code assignment priority can be set in the background image, the next lowest code assignment priority can be set in the foreground image, and a high code assignment priority can be set in the mask image. Therefore, at Step S207, when the coded data of the background image with the lowest code assignment priority is targeted for the control of the code amount by deleting the codes, but necessary code amount deletion cannot be performed, the coded data of the foreground image with the next lowest code assignment priority can also be targeted for the code deletion. The present embodiment also includes such an embodiment.

<Step S208> In the multilayer structuring unit 154, the coded data of each layer obtained at the preceding steps is coupled with necessary format description being added (see FIG. 6) to create multilayer structure data (file). When a PDF file is created as the multilayer structure data, a page object structure, an order for superimposing images, the designation of the mask image, or the like is added as format description. For designating a filter for image code, a form for describing the length of the code is completed with the code amount after deleted at the preceding step as the length. The created PDF file is written in, for example, the HDD 155.

<Step S209> The PDF file written in the HDD 155 is read out by the system controller 156 and is received in the image transmission apparatus 103. The image transmission apparatus 103, for example, includes a mail server function, creates a mail attached with the received PDF file, designates a mail address of the destination client computer 104, and sends the mail through the network 105.

Second Embodiment

Figure 8:
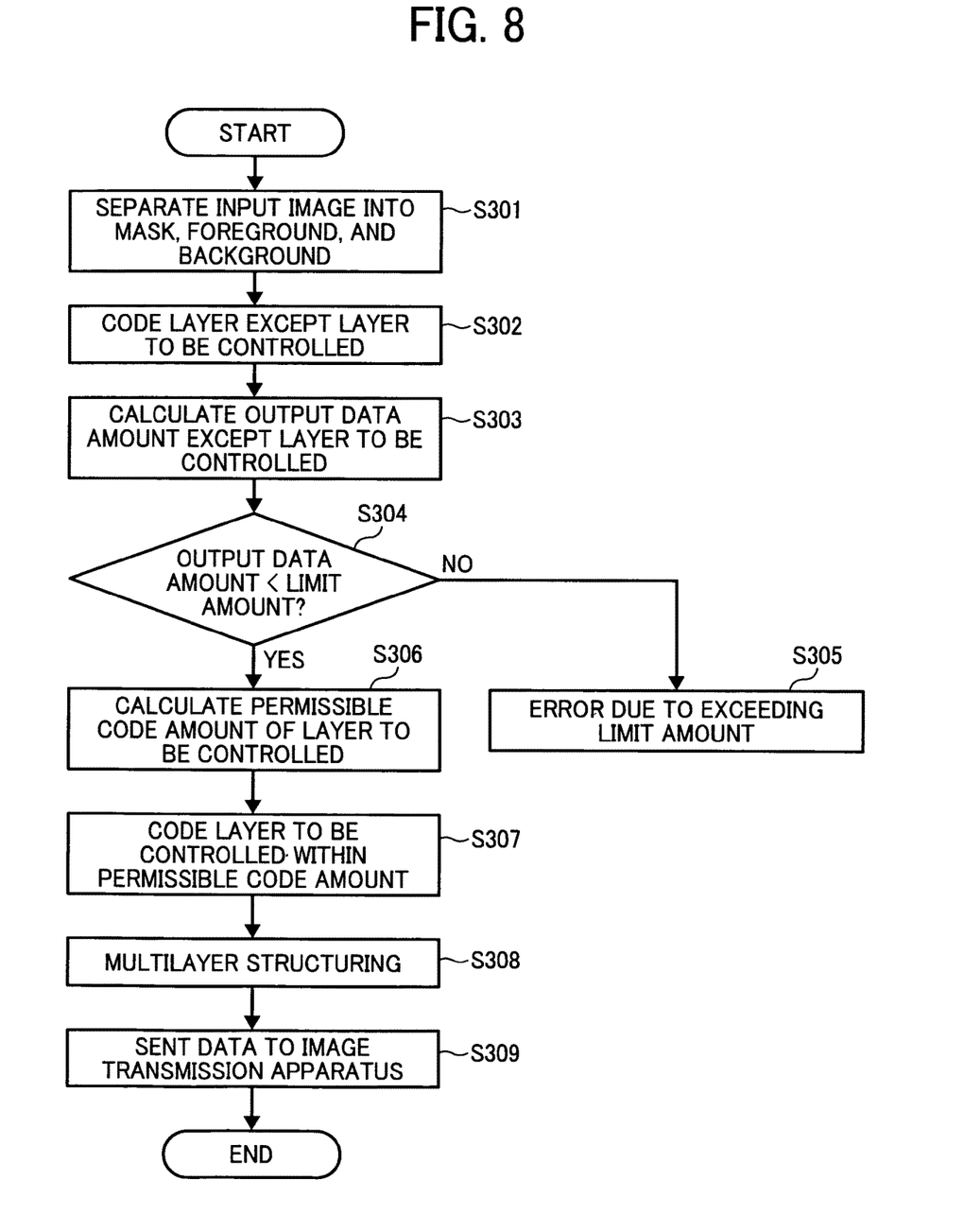
FIG. 8 is a flowchart for explaining a process in Second Embodiment.

FIG. 8 is a flowchart for explaining a process in the image processing apparatus 101 according to the present embodiment. The process is described below with reference to a process flow illustrated in FIG. 8.

<Step S301> as with Step S201 of FIG. 5, the image separating unit 151 separates the input image and creates three layer images (derivative images) of a mask image, a foreground image, and a background image.

<Step S302> In the coding unit 152, only layer images that are not targeted for the control of the code amount are coded out of the three layer images. At this step, high code assignment priorities are set in both the mask image and the foreground image, and a low code assignment priority is set in the background image. Only the background image is targeted for the control of the code amount, and the mask image and the foreground image are coded. The coding system used for each layer image is the same as that at Step S202 of FIG. 5.

<Step S303> The code amount controller 153 calculates an output data amount by adding the data amount of the coded data of the mask image and the foreground image that are obtained at the preceding step and that are not targeted for the control of the code amount to the data amount required for the format description of a PDF.

<Step S304> The code amount controller 153 judges whether the output data amount calculated at the preceding step is within a limit amount designated by users or predetermined. If the output data amount exceeds the limit amount, the system controller 156 performs error control because there is no space left for storing the codes of the background image to be controlled (Step S305). If the output data amount is within the limit amount, the system control goes to Step S306.

<Step S306> The code amount controller 153 calculates a permissible code amount by subtracting the output data amount that is calculated at Step S303 and that contains no code of the layer image targeted for the control of the code amount from the limit amount.

<Step S307> In the coding unit 152, JPEG2000 coding is performed on the background image targeted for the control of the code amount. The permissible code amount calculated at the preceding step is designated in the coding unit 152, and the coding unit 152 controls the code amount so as not to exceed the permissible code amount in which the code amount is designated during the coding process. The control of the code amount in such a JPEG2000 coding process is disclose in, for example, Japanese Patent No. 4064279, and other numerous documents, and therefore, no further description is given.

The coding unit 152 can also perform coding without designating a permissible code amount, and the code amount of the created coded data can be deleted to be equal to or less than the permissible code amount by deleting the codes by the code amount controller 153. Such an embodiment is also included in the present embodiment.

<Step S308> As with Step S208 of FIG. 5, in the multilayer structuring unit 154, the coded data of the mask image and the foreground image created at Step S302 and the coded data of the background image created at Step S307 are coupled with necessary format description being added, and thus, a PDF file as multilayer structure data is created. The created PDF file is written in the HDD 155.

<Step S309> As with Step S209 of FIG. 5, the PDF file stored in the HDD 155 is read out by the system controller 156 and is received in the image transmission apparatus 103. This PDF file is sent to the destination client computer 104 as an attachment file of a mail or the like.

Third Embodiment

Figure 9:
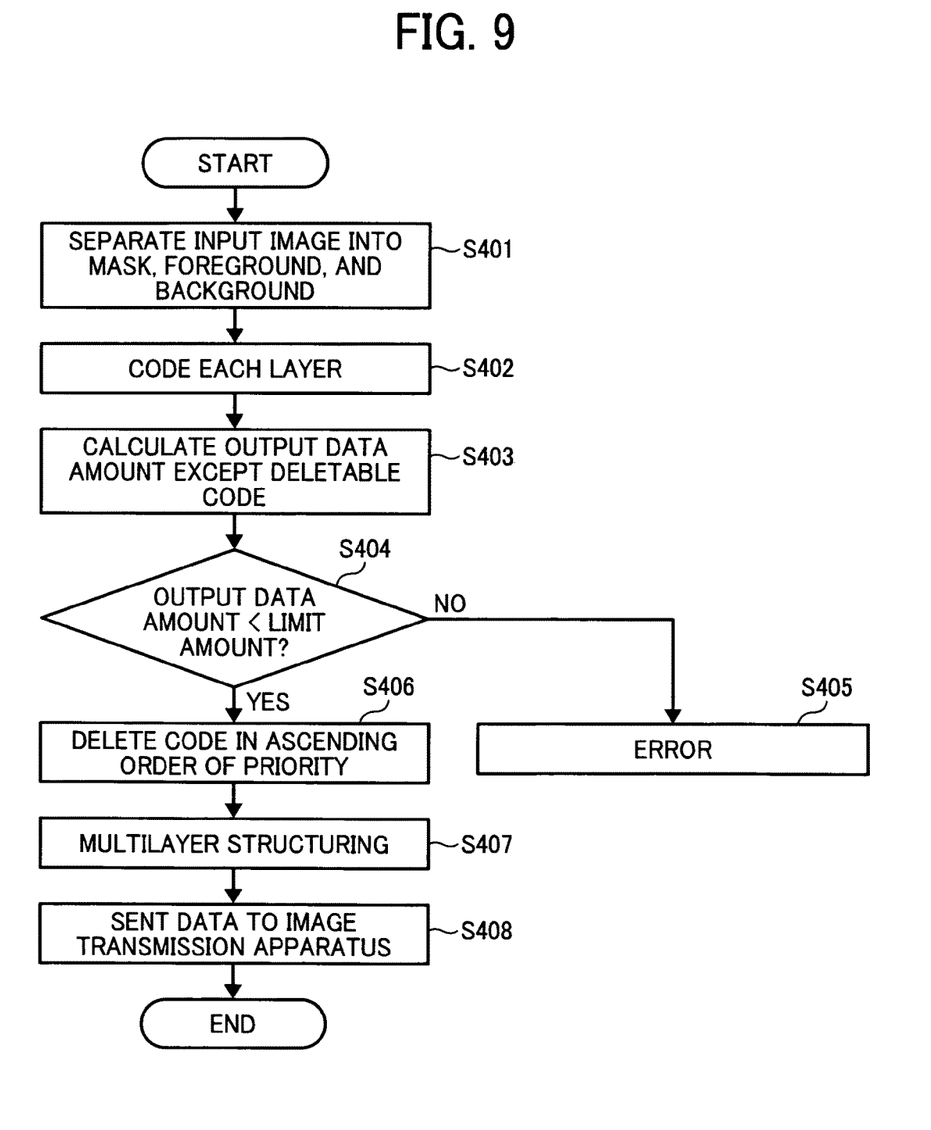
FIG. 9 is a flowchart for explaining a process in Third Embodiment.

FIG. 9 is a flowchart for explaining a process in the image processing apparatus 101 according to the present embodiment. The process is described below with reference to a process flow illustrated in FIG. 9.

<Step S401> As with Step S201 of FIG. 5, the image separating unit 151 separates the input image and creates three layer images (derivative images), that is, a mask image, a foreground image, and a background image.

<Step S402> In the coding unit 152, each layer image is separately coded. As with First and Second Embodiments, the foreground image and the background image are coded using JPEG2000 in a multivalued image coding system, and the mask image is coded using not MMR but JBIG2 (ITU-T T.88).

Figure 10:
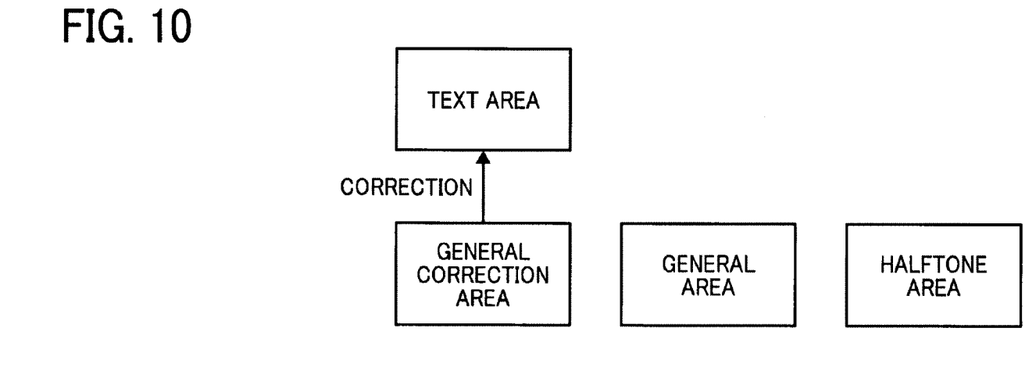
FIG. 10 is a schematic diagram for explaining coding areas in joint bi-level image experts group 2 (JBIG2)
Figure 11:
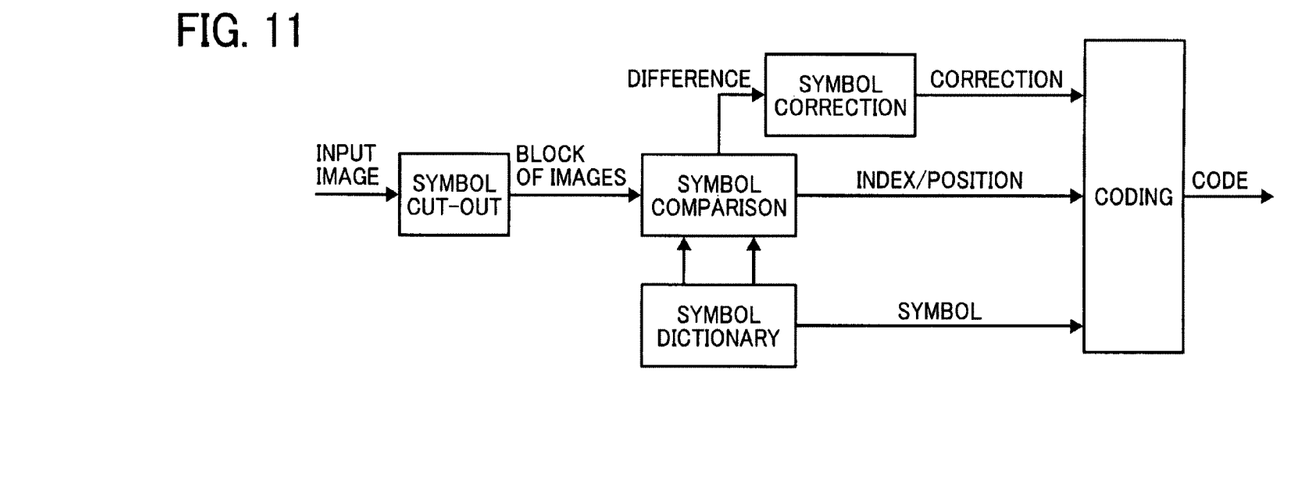
FIG. 11 is a block diagram for explaining a text coding process in JBIG2.

Both lossless coding and lossy coding are possible in JBIG2. Lossy coding causes image degradation but can reduce a code amount. FIG. 10 illustrates a coding area in JBIG2. FIG. 11 illustrates a text coding process in JBIG2.

As illustrated in FIG. 10, the coding area in JBIG2 is divided into four area's of a "text area", a "general correction area", a "general area", and a "halftone area".

As illustrated in FIG. 11, in the "text area" among the four areas, a symbol appearing in an image is detected and is formed into a bit map pattern ("symbol cut-out"), and the symbol is registered in a "symbol dictionary". The cut-out symbol is compared with the symbol registered in the symbol dictionary ("symbol comparison"). When the cut-out symbol is matched up at the symbol comparison, in other words, when the symbol similar to the registered symbol appears in the image, the bitmap of the symbol is not coded, but the index of the registered symbol matched up at the comparison and the position of the symbol on the image are coded ("coding"). In the "general correction area", a bitmap that corrects the deference of the symbol matched up in the "text area" is coded. In other words, when the cut-out symbol and the registered symbol are judged to be matched up at the "symbol comparison" in FIG. 11, a bitmap that corrects the difference of the symbols is created at the "symbol correction", and this bitmap ("correction") is coded. The symbol registered in the symbol dictionary is also coded. In the "halftone area", a bitmap subjected to halftone processing or dither processing is coded, and in the "general area", the remaining isolated point or the like is coded.

JBIG2 includes a few methods for lossy coding. The code amount in lossy coding can be reduced compared with the code amount in lossless coding by, for example, a method in which coding in the general correction area is not performed during coding ("symbol correction" process in FIG. 11 is omitted) or a method in which the codes in the "general correction area" are deleted after coding.

<Step S403> The code amount controller 153 calculates an output data amount by adding the total amount of the coded data of the three layer images in which the deletable code (described later) is deleted to the data amount for format description.

<Step S404> The code amount controller 153 judges whether the output data amount calculated at the preceding step is within the limit amount. If the output data amount exceeds the limit amount, the system controller 156 performs error control because the data amount of the final output data (PDF file) cannot be reduced to fall within the limit amount by deleting the codes (Step S405). If the output data amount is judged to be within the limit amount, the system control goes to Step S406.

<Step S406> In the present embodiment, a priority for each partial code is set in the coded data of each layer image, and the codes are deleted sequentially from a partial code with a low priority to a partial code with a high priority to reduce the output data to the limit amount.

For JPEG2000 coded data of the foreground image and the background image, priorities are set while assuming that the part enhancing the resolution or the quality is a partial code. Similarly, for JBIG2 coded data of the mask image, priorities are set while assuming that a general correction area code and a halftone code are partial codes enhancing image quality.

Figure 12:
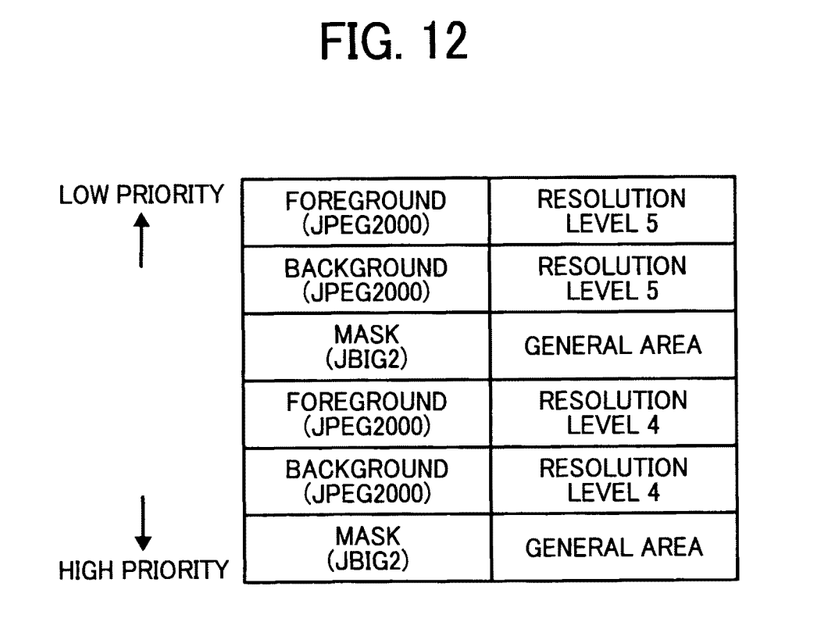
FIG. 12 is a schematic diagram of an example of codes arranged in order of priorities.

Such priority setting is exemplified in FIG. 12. In this example, a code in resolution level 5 that has the lowest priority and is in JPEG2000 coded data of the foreground image is deleted. When further deletion of the codes is required, a code in resolution level 5 that has the second lowest priority and is in JPEG2000 coded data of the background image is deleted. When further deletion of the codes is required, a general correction area code in JBIG2 coded data of the mask image is deleted. When further deletion of the codes is required, a code in resolution level 4 in JPEG2000 coded data of the foreground image, a code in resolution level 4 in JPEG2000 coded data of the background image, and a general area code in JBIG2 coded data of the mask image are deleted in such a sequential manner. Such control of the output data amount by sequentially deleting codes from a partial code with a low priority to a partial code with a high priority enables image degradation caused when a multilayer image is synthesized to be unnoticeable.

The "deletable code" at Step S403 indicates codes ordered for code deletion as the example in FIG. 12.

As understood from the description described above and FIG. 12, in the present example, equivalent code assignment priorities are set in the mask image, the foreground image, and the background image. Therefore, the code amount deleting order between these layers is determined by only the priorities set in each partial code as illustrated in FIG. 12.

In addition, for example, a high code assignment priority can be set in the mask image, low code assignment priorities can be set in the foreground image and the background image, and the priorities for each partial code as illustrated in FIG. 12 can be set only in the foreground image and the background image with low code assignment priorities. In this case, the codes in the coded data of the foreground image and the background image with low code assignment priorities are sequentially deleted from the code with a low priority to the code with a high priority that are set for each partial code to delete the output data amount to be equal to or less than the limited amount. The present embodiment also includes such an embodiment.

<Step S407> As with Step S208 of FIG. 5, in the multilayer structuring unit 154, the coded data of layer images to which necessary code deletion is performed at the preceding step is coupled with necessary format description being added to create a PDF file as multilayer structure data. The created PDF file is written in the HDD 155.

<Step S408> As with Step S209 of FIG. 5, the PDF file is read out from the HDD 155 and is received in the image transmission apparatus 103.

It is apparent that the description described above is also description for an image processing method of the present invention. Therefore, the description for the image processing method is not repeated.

The present invention also includes a computer program that makes a computer perform each process of the process flow of the image processing apparatus according to each of the embodiments described above, and various recording media readable by a computer in which the computer perform is recorded.

The image processing apparatus and the image processing method according to the present invention can generate multilayer structure data in which the data amount is kept to a limited amount or less while suppressing image degradation caused when a multilayer image is synthesized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
an image separating unit that separates and creates a plurality of derivative images from an input image based on a feature of the input image, wherein the plurality of derivative images includes a mask image, foreground image and background image;
a coding unit that codes each of the derivative images separately and couples coded data of the derivative images to generate multilayer structure data; and
a controller that controls a code amount of coded data of at least one derivative image with a low code assignment priority out of the derivative images so that a data amount of the multilayer structure data is equal to or less than a limit amount by deleting the code amount of the at least one derivative image with the low code assignment priority, wherein
the controller sets the low code assignment priority in the background image, a next low code assignment priority in the foreground image, and a high code assignment priority in the mask image,
the controller determines an excess amount of coded data by calculating a code amount of the data amount of the multilayer structure data which exceeds the limit amount, and
the controller deletes the code amount with the next low code assignment priority when the excess amount of coded data is greater than or equal to a data amount of the coded data of the background image.

2. The image processing apparatus according to claim 1, wherein
the controller sorts code of the coded data of the at least one derivative image in a predetermined sorting order, and then reduces the code amount of the coded data of the at least one derivative image by sequentially deleting the code starting from a last code.

3. The image processing apparatus according to claim 2, wherein
the controller sorts the code in ascending order of resolution.

4. The image processing apparatus according to claim 1, wherein
the controller sets a priority for each partial code in the coded data of the at least one derivative image, and
the controller sequentially deletes code of the coded data of the at least one derivative image starting from a partial code with a low priority to a partial code with a high priority.

5. The image processing apparatus according to claim 1, wherein
the controller controls the code amount of the coded data in a coding process of the at least one derivative image.

6. An image processing method comprising:
separating and creating a plurality of derivative images from an input image based on a feature of the input image, wherein the plurality of derivative images includes a mask image, foreground image and background image;

coding each of the derivative images separately and coupling coded data of the derivative images to generate multilayer structure data; and controlling a code amount of coded data of at least one derivative image with a low code assignment priority out of the derivative images so that a data amount of the multilayer structure data is equal to or less than a limit amount by deleting the code amount of the at least one derivative image with the low code assignment priority, wherein the controller sets the low code assignment priority in the background image, a next low code assignment priority in the foreground image, and a high code assignment priority in the mask image, the controller determines an excess amount of coded data by calculating a code amount of the data amount of the multilayer structure data which exceeds the limit amount, and the controller deletes the code amount with the next low code assignment priority when the excess amount of coded data is greater than or equal to a data amount of the coded data of the background image.

7. The image processing method according to claim 6, further comprising:

sorting code of the coded data of the at least one derivative image in a predetermined sorting order, and then reducing the code amount of the coded data of the at least one derivative image by sequentially deleting the code starting from a last code.

8. The image processing method according to claim 7, wherein the code is sorted in ascending order of resolution.

9. The image processing method according to claim 6, further comprising:

setting a priority for each partial code in the coded data of the at least one derivative image, and wherein code of the coded data of the at least one derivative image is sequentially deleted starting from a partial code with a low priority to a partial code with a high priority.

10. The image processing method according to claim 6, wherein the code amount of the coded data is controlled in a coding process of the at least one derivative image.

11. The image processing apparatus according to claim 1, wherein the plurality of derivative images includes a plurality of foreground images.

12. The image processing apparatus according to claim 1, wherein the feature includes edge, edge strength or lightness of the input image.

13. The image processing apparatus according to claim 1, wherein separation information is created based on the feature, and the background image and the foreground image are created from pixels in the input image according to the separation information.

14. The image processing apparatus according to claim 1, wherein the image separating unit separates pixels in the input image as a character pixel and a pattern pixel based on the feature, the foreground image is created according to color information of the character pixel, and the background image is created according to color information of the pattern pixel.

15. The image processing apparatus according to claim 1, wherein the controller obtains the data amount of the multilayer structure data by adding a data amount of the coded data of the mask image, a data amount of the coded data of the foreground image, and a data amount of the coded data of the background image.

16. The image processing apparatus according to claim 1, wherein the controller sets the low code assignment priority in the background image and the high code assignment priority in both the mask image and the foreground image.

17. The image processing apparatus according to claim 1, wherein the code amount deleted in the at least one derivative image with the low code assignment priority is the excess amount of coded data.

18. An image processing apparatus comprising:

an image separating unit that separates and creates a plurality of derivative images from an input image based on a feature of the input image, wherein the plurality of derivative images includes a mask image, foreground image and background image;

a coding unit codes the mask image and the foreground image, and couples the coded data to generate multilayer structure data; and a controller that controls a code amount of coded data of at least one derivative image with a low code assignment priority out of the derivative images so that a data amount of the multilayer structure data is equal to or less than a limit amount, and the derivative image with a low code assignment priority is subsequently coded and coupled with the multilayer structure data so as to not exceed the limit amount, wherein the controller sets the low code assignment priority in the background image, a next low code assignment priority in the foreground image, and a high code assignment priority in the mask image, the controller determines an excess amount of coded data by calculating a code amount of the data amount of the multilayer structure data which exceeds the limit amount, and the controller deletes the code amount with the next low code assignment priority when the excess amount of coded data is greater than or equal to a data amount of the coded data of the background image.

* * * * *